(12) United States Patent
Goodall et al.

(10) Patent No.: US 11,287,982 B2
(45) Date of Patent: Mar. 29, 2022

(54) ASSOCIATING DATA MANAGEMENT POLICIES TO PORTIONS OF DATA USING CONNECTION INFORMATION

(71) Applicant: International Business Machines Corporation, Armonk, NY (US)

(72) Inventors: Lourie Goodall, Tucson, AZ (US); Joseph M. Swingler, Phoenix, AZ (US); Edward Hsiu-Wei Lin, Tucson, AZ (US); Erika Dawson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 16/510,709

(22) Filed: Jul. 12, 2019

(65) Prior Publication Data

US 2021/0011624 A1    Jan. 14, 2021

(51) Int. Cl.
G06F 3/06 (2006.01)

(52) U.S. Cl.
CPC .......... G06F 3/0613 (2013.01); G06F 3/0629 (2013.01); G06F 3/0673 (2013.01)

(58) Field of Classification Search
CPC .... G06F 3/0613; G06F 3/0673; G06F 3/0629; G06F 3/065
See application file for complete search history.

(56) References Cited

U.S. PATENT DOCUMENTS

| 9,116,623 | B2 | 8/2015 | Ashok et al. |
| 9,946,467 | B2 | 4/2018 | Sun |
| 9,971,544 | B1 | 5/2018 | Johnson et al. |
| 10,264,074 | B2 | 4/2019 | Vijayan et al. |
| 2003/0225881 | A1* | 12/2003 | Saxena ................. H04L 45/742 709/224 |
| 2008/0151891 | A1* | 6/2008 | Juszkiewicz ............ H04L 69/22 370/392 |

(Continued)

FOREIGN PATENT DOCUMENTS

JP    5460042 B2    4/2014

OTHER PUBLICATIONS

Mesnier et al., "Object-Based Storage," IEEE Communications Magazine, Aug. 2003, pp. 84-90.

(Continued)

*Primary Examiner* — Chie Yew
(74) *Attorney, Agent, or Firm* — Zilka-Kotab, P.C.

(57) ABSTRACT

A computer-implemented method, according to one embodiment, is for managing data received at a storage device. The computer-implemented method includes: receiving data management policies, and receiving two or more connection names from a host. Each of the connection names is correlated with one or more of the data management policies. Moreover, a connection path which extends between the storage device and the host is created. The connection path also has a connection name which corresponds thereto. Data is received along the connection path, and the connection name which corresponds to the connection path is matched to one of the connection names received from the host. Furthermore, the received data is processed according to the one or more data management policies that are correlated with the matching one of the connection names received from the host.

16 Claims, 8 Drawing Sheets

(56) References Cited

U.S. PATENT DOCUMENTS

| | | | | |
|---|---|---|---|---|
| 2012/0072684 A1* | 3/2012 | Cho | ................... | G06F 12/0868 |
| | | | | 711/161 |
| 2014/0344329 A1* | 11/2014 | Fox | ................... | G06F 15/17331 |
| | | | | 709/203 |
| 2015/0254150 A1* | 9/2015 | Gordon | ............... | G06F 11/1469 |
| | | | | 714/6.3 |
| 2016/0006765 A1* | 1/2016 | Shem Tov | ............. | G06Q 10/06 |
| | | | | 726/1 |
| 2016/0070725 A1* | 3/2016 | Marrelli | .................. | G06F 16/84 |
| | | | | 707/692 |
| 2016/0380970 A1* | 12/2016 | Jacobson | ............ | H04L 63/0227 |
| | | | | 713/176 |
| 2017/0262185 A1* | 9/2017 | Long | ..................... | G06F 3/0605 |
| 2017/0357445 A1* | 12/2017 | Chen | ..................... | G06F 9/5016 |
| 2018/0267979 A1 | 9/2018 | Stickle | | |
| 2018/0375938 A1 | 12/2018 | Vijayan et al. | | |

OTHER PUBLICATIONS

Anonymous, "A Lazy Data Redistribution Policy for storage system," IP.com Prior Art Database, Technical Disclosure No. IPCOM000256163D, Nov. 8, 2018, 6 pages.

CSRC, "Cloud Computing," Computer Security Resource Center, Oct. 2017, 3 pages, retrieved from https://csrc.nist.gov/projects/cloud-computing.

Anonymous, "NIST Cloud Computing Program," NIST, Information Technology Laboratory, Nov. 13, 2013, pp. 1-2, retrieved from www.nist.gov/itl/cloud/.

Mell et al., "The NIST Definition of Cloud Computing," Version 15, Oct. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

* cited by examiner

… (1)

ASSOCIATING DATA MANAGEMENT POLICIES TO PORTIONS OF DATA USING CONNECTION INFORMATION

BACKGROUND

The present invention relates to data storage systems, and more specifically, this invention relates to applying data management policies to portions of data.

As data utilization steadily increases, data storage systems have been faced with the task of maintaining updated copies of data while also increasing accessibility of the data. In an effort to accomplish these data related demands, some data storage systems have implemented a central data storage location which is able to communicate with one or more users that write data thereto and/or read data therefrom. For instance, in such data storage systems, users issue input/output (I/O) requests to the central storage location, which ultimately accesses and/or modifies data according to in the I/O requests that are received.

This storage scheme allows for data to be stored in high performing data storage devices which may be made accessible to any number of users, e.g., as long as a communication connection exists therebetween. While this reduces the amount of data management that is performed at the actual user locations, it also causes a notable amount of processing overhead to be experienced. This overhead is caused as a result of the amount of information being transferred between each user and the central storage location being used to store and process the data. For instance, conventional systems rely on specific instructions being sent which specify how and/or where each portion of data is intended to be stored, thereby introducing performance delays which increase with the number of users and/or storage locations that are implemented. Moreover, a failure event experienced at any of the locations and/or the connections extending therebetween disrupts the transfer of I/O requests therebetween.

SUMMARY

A computer-implemented method, according to one embodiment, is for managing data received at a storage device. The computer-implemented method includes: receiving data management policies, and receiving two or more connection names from a host. Each of the connection names is correlated with one or more of the data management policies. Moreover, a connection path which extends between the storage device and the host is created. The connection path also has a connection name which corresponds thereto. Data is received along the connection path, and the connection name which corresponds to the connection path is matched to one of the connection names received from the host. Furthermore, the received data is processed according to the one or more data management policies that are correlated with the matching one of the connection names received from the host.

A system, according to another embodiment, includes: a processor, and logic integrated with the processor, executable by the processor, or integrated with and executable by the processor. In some approaches the logic is configured to: perform the foregoing method.

A computer program product, according to yet another embodiment, is for managing data sent to a remote storage device. The computer program product includes a computer readable storage medium having program instructions embodied therewith. The program instructions are also readable and/or executable by a processor to cause the processor to: separate data into at least two portions, such that each portion of data corresponds to a different combination of data management policies. The data management policies are sent to a remote storage device, and a connection name is correlated with each of the different combinations of data management policies. The connection names are also sent to the remote storage device. Moreover, at least two connection paths which extend between a host and the remote storage device are created, and one of the connection names is assigned to each of the created connection paths. Further still, each portion of data is sent to the remote storage device along the connection path having the connection name that is correlated with the combination of data management policies which corresponds to the given portion of data.

Other aspects and embodiments of the present invention will become apparent from the following detailed description, which, when taken in conjunction with the drawings, illustrate by way of example the principles of the invention.

DETAILED DESCRIPTION

Figure 1:
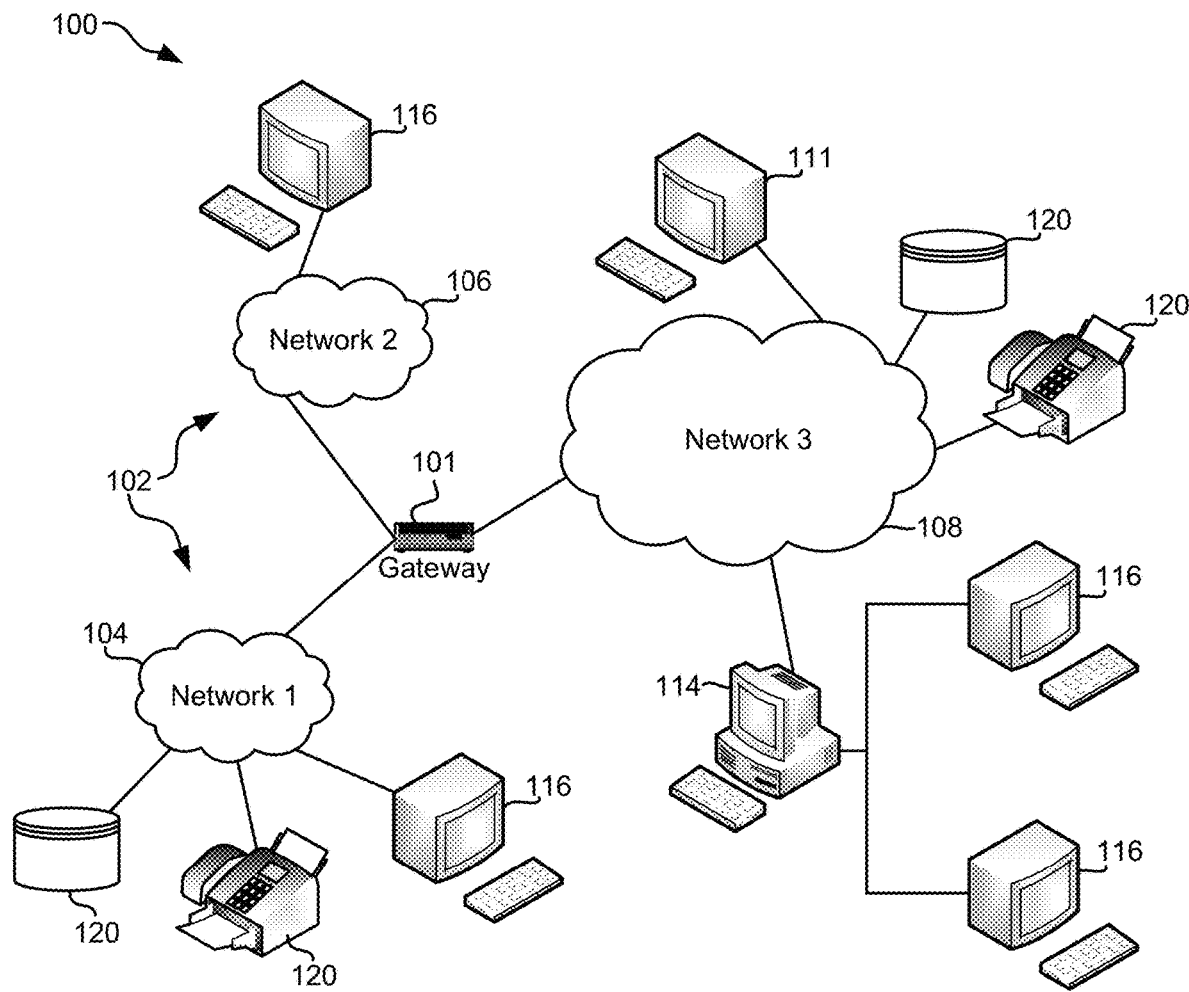
FIG. 1 is a partial representational view of a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for associating connection names with connection paths based on what data will be transmitted along each of the respective connection paths. Therefore, portions of data may be sent along each of the connection paths, subsequently received at a remote storage device, and processed as desired without having to attach specific data management instructions to each file, object, etc. that is sent to the remote storage device. This significantly reduces the amount of network traffic that is experienced, particularly in comparison to conventional implementations, e.g., as will be described in further detail below.

In one general embodiment, a computer-implemented method is for managing data received at a storage device. The computer-implemented method includes: receiving data management policies, and receiving two or more connection names from a host. Each of the connection names is correlated with one or more of the data management policies. Moreover, a connection path which extends between the storage device and the host is created. The connection path also has a connection name which corresponds thereto. Data is received along the connection path, and the connection name which corresponds to the connection path is matched to one of the connection names received from the host. Furthermore, the received data is processed according to the one or more data management policies that are correlated with the matching one of the connection names received from the host.

In another general embodiment, a system includes: a processor, and logic integrated with the processor, executable by the processor, or integrated with and executable by the processor. In some approaches the logic is configured to: perform the foregoing method.

In yet another general embodiment, a computer program product is for managing data sent to a remote storage device. The computer program product includes a computer readable storage medium having program instructions embodied therewith. The program instructions are also readable and/or executable by a processor to cause the processor to: separate data into at least two portions, such that each portion of data corresponds to a different combination of data management policies. The data management policies are sent to a remote storage device, and a connection name is correlated with each of the different combinations of data management policies. The connection names are also sent to the remote storage device. Moreover, at least two connection paths which extend between a host and the remote storage device are created, and one of the connection names is assigned to each of the created connection paths. Further still, each portion of data is sent to the remote storage device along the connection path having the connection name that is correlated with the combination of data management policies which corresponds to the given portion of data.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
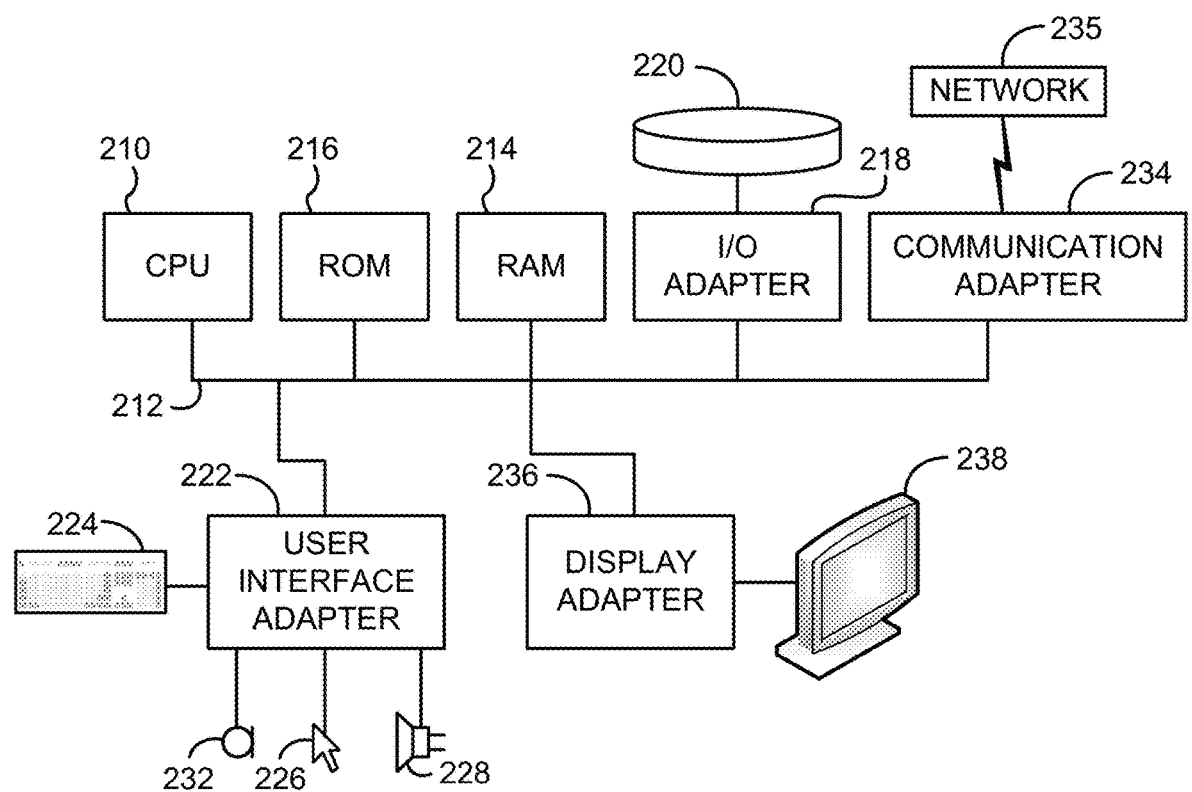
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
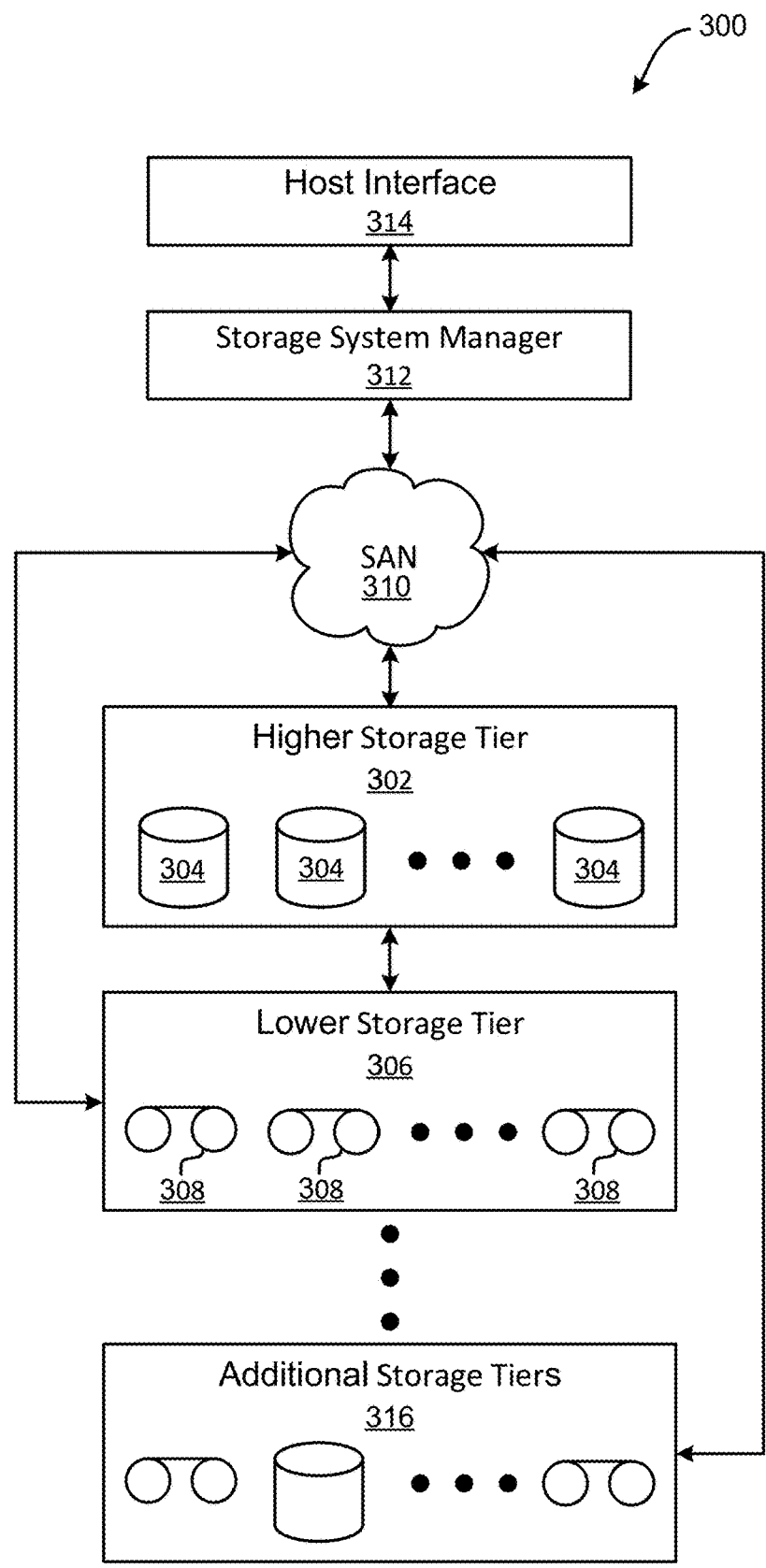
FIG. 3 is a partial representational view of a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier 302 and the lower storage tier 306 each provide some type of benefit, e.g., at least in comparison to the other. For example, the higher storage tier 302 may provide increased performance and data accessibility compared to that of the lower storage tier 306, while the lower storage tier 306 provides increased longevity, improved data retention, and reduced costs compared to that of the higher storage tier 302.

According to an exemplary approach, which is in no way intended to limit the invention, the higher storage tier(s) 302 include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. Moreover, the lower storage tier(s) 306 include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions. Moreover, this logic may be implemented as a method on any device and/or system or as a computer program product, according to various embodiments.

As previously mentioned, some data storage systems have implemented a central data storage location which is able to communicate with one or more users that write data thereto and/or read data therefrom. For instance, in such data storage systems, users issue I/O requests to the central storage location, which ultimately accesses and/or modifies data according to in the I/O requests that are received. This storage scheme allows for data to be stored in high performance data storage devices which may be made accessible to any number of users, e.g., as long as a communication connection exists therebetween.

While this reduces the amount of data management that is performed at the actual user locations, it has also caused a notable amount of processing overhead to be experienced in conventional implementations. This overhead is caused as a result of the amount of information being transferred between each user and the central storage location being used to store and process the data. For instance, conventional systems rely on specific instructions being sent with each portion of data which stipulate how and/or where each portion of data is intended to be stored.

Furthermore, as cloud storage becomes more prevalent, storage systems are faced with the task of storing different types of data that is received from a wide variety of users. However, most existing cloud storage devices have little or no real data management abilities. For instance, a cloud system may offer a data redundancy solution, but otherwise there is little else that can be done other than deleting unwanted data. As such, data management is handled at the user level and is usually not robust, causing previous methods of managing large amount of data to become cumbersome. While object storage has been implemented in an attempt to combat some of these issues, as the number of objects in storage increases, the same issues have surfaced with the overhead of managing billions of smaller object files.

However, in sharp contrast to these conventional shortcomings, various ones of the embodiments included herein are able to assign data management policies without having a host (e.g., user) make major modifications to support the various management policies of a given storage system. These embodiments allow the host to simply send data through a specified connection path after correlating that path with the existing policy management rules for the storage system. It follows that if a user wishes to assign a different set of data management policies to a set of data, they can simply specify a different connection value, e.g., as will be described in further detail below.

Figure 4A:
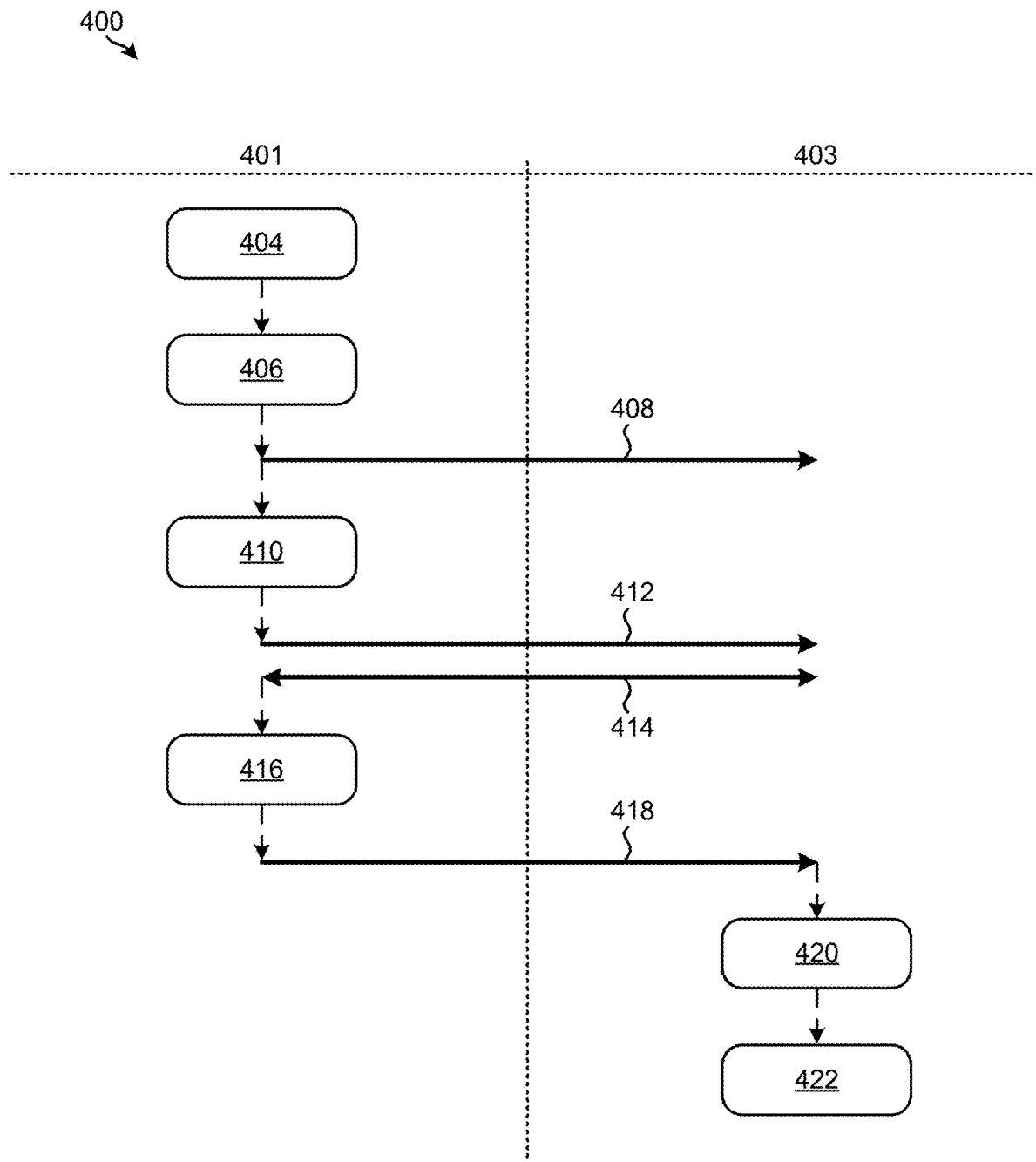
FIG. 4A is a flowchart of a method in accordance with one embodiment.

Referring now to FIG. 4A, a flowchart of a computer-implemented method 400 for managing data sent to, and therefore received by, a storage device is shown according to one embodiment. The method 400 may be performed in accordance with the present invention in any of the environments depicted in FIGS. 1-3, among others, in various embodiments. Of course, more or less operations than those specifically described in FIG. 4A may be included in method 400, as would be understood by one of skill in the art upon reading the present descriptions.

Each of the steps of the method 400 may be performed by any suitable component of the operating environment. For example, each of the nodes 401, 403 shown in the flowchart of method 400 may correspond to one or more processors positioned at a different location in a distributed data storage system. Moreover, each of the one or more processors are preferably configured to communicate with each other.

In various embodiments, the method 400 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As mentioned above, FIG. 4A includes different nodes 401, 403, each of which represent one or more processors, controllers, computer, etc., positioned at a different location in a multi-tiered data storage system. For instance, node 401 may include one or more processors which are electrically coupled to a first host location of a distributed data storage system (e.g., see first host location 502 of FIG. 5 below). Furthermore, node 403 may include one or more processors which are configured as a central data storage device that is in communication with the one or more processors at node 401. Accordingly, commands, data, requests, etc. may be sent between each of the nodes 401, 403 depending on the approach. Moreover, it should be noted that the various processes included in method 400 are in no way intended to be limiting, e.g., as would be appreciated by one skilled in the art after reading the present description. For instance, data sent from node 401 to node 403 may be prefaced by a request sent from node 403 to node 401 in some approaches.

As shown, operation 404 of method 400 is performed by one or more processors at node 403. Accordingly, operation 404 is performed by one or more processors which are electrically coupled to the first host location. Operation 404 includes separating data at the first host location into at least two different portions based on how the data should be processed. In other words, the data is preferably separated such that data that is included in a same portion or "subset" of the total data would benefit from the same management policies being applied thereto. As alluded to above, it may be desirable that a given portion of data is managed in a particular way. For example, a portion of data identified as having a relatively low priority level associated therewith may preferably be managed using a combination of data management policies that promote data compression, data deduplication, shorter data retention rates, etc. However, a portion of data identified as having a relatively high priority level associated therewith may preferably be managed using a combination of data management policies that promote data redundancy, longer data retention rates, data encryption, etc.

With respect to the present description, it should be noted that a "portion" of data may include any desired unit of digital information. For instance, the data at the first host location may be separated into a number of logical buckets, where each logical bucket includes a specific collection of logical files, objects, logical pages, etc. Data (e.g., a specific object) may be assigned to a particular logical bucket by updating a flag associated with the data, listing the data or an identifier associated therewith in a lookup table, placing the data or a copy thereof in a cache, etc.

Moreover, the data at the first host location may have accumulated there as a result of a number of host write operations being received over time, a number of data updates being submitted over time, etc. It follows that the data at the first host location may be received from the host, a running application, one or more other host locations and/or storage systems, etc. The specific data management policies that are preferably implemented for a given portion of data, host location in general, type of data, type of data operation, etc. thereby varies depending on the desired approach.

Returning now to FIG. 4A, operation 406 includes creating a desired number of data management policies. With respect to the present description, a data management policy addresses the management and governance of a particular grouping of data. A data management policy thereby preferably defines how data should be handled with respect to a particular aspect of data management. According to an example, which is in no way intended to limit the invention, a data management policy which pertains to data compression may specify what compression rates should be applied, what types of data should be compressed, factors which should be considered in conjunction with compression, etc. This compression related data management policy may thereby be applied to any portion of data to achieve desired data compression.

The number and/or type of individual data management policies that are created in operation 406 may vary, e.g., depending on the desired approach. For instance, an illustrative list of data management policy types includes, but is in no way limited to, data redundancy, physical storage location (e.g., at a multi-tiered data storage location), data compression, data retention, data encryption, etc. Moreover, it should be noted that data management policies may be added and/or removed from an existing list over time. In other words, data management policies may be newly introduced in the background of method 400. Furthermore, any processes which would be apparent to one skilled in the art after reading the present description may be implemented in order to create data management policies for the portions of data.

Proceeding to operation 408, the created data management policies are sent to the remote storage device at node 403. Accordingly, the storage device at node 403 receives the data management policies from the first host location. Returning to node 401, method 400 also includes correlating connection names with different combinations of data management policies. See operation 410. While a single data management policy addresses how data should be handled with respect to a particular aspect of data management, more than one data management policy may be combined together to form a more encompassing data management scheme. The specific data management policies that are combined together can be tailored depending on the desired aggregate effect.

In some approaches the combinations of data management policies may actually be created by a user (e.g., an administrator) who has access to the one or more processors at node 401. Thus, in some approaches the combinations of data management policies may be predefined by a user, e.g., based on the type of data included at the first host location. In other approaches, a combination of data management policies may be created by initially evaluating a portion of data as well as the characteristics that are associated therewith. This evaluation may reveal an overall profile that includes properties of the given portion of data which should be promoted, and other properties which should be demoted. Again, according to an example, a portion of data that has been separated into a first logical bucket may be identified as including high priority data, thereby indicating that data security and redundancy should be promoted. It follows that a combination of data management policies which implement data encryption, data redundancy, etc., are combined and used to manage this subset of data.

Once a specific combination of data management policies has been identified, a unique connection name is preferably correlated thereto. The unique connection name may be identified by a unique combination of alphanumeric characters, binary values, flags, etc. This effectively allows for a unique identifier to be attached to each specified combination of data management policies. The unique identifier, or connection name, correlated with a given combination of data management policies may thereby be used by a user to indicate how a portion of data should be managed in significant detail without introducing an undesirable amount of network traffic, e.g., as will be described in further detail below.

Looking to operation 412, the connection names are sent to the remote storage device at node 401. Accordingly, upon receiving the connection names from the host at node 401, the one or more processors at node 403 are aware of how each of the connection names is correlated with a specific combination of the data management policies.

Operation 414 further includes creating (e.g., opening) at least two connection paths, each of which extend between the first host location at node 401 and the remote storage device at node 403. The number of connection paths that are created in operation 414 corresponds to the number of data portions created in operation 406 above in some approaches. As a result, each portion of data is afforded a connection path extending between the first host location and the remote storage device.

The process of forming a connection path which extends between the remote storage device location and a host location involves exchanging payload information between the two locations. The payload information may be sent between the remote storage device location and the host location using a wireless connection, e.g., WiFi, Bluetooth, a cellular network, etc.; a physical electrical connection, e.g., a cable, a fiber-optic link, a wire, Ethernet cable, a fiber channel cable, etc.; etc., or any other type of connection which extends between the locations and which would be apparent to one skilled in the art after reading the present description. Moreover, a physical electrical connection also extends between the remote storage device itself and the object storage system, e.g., which may be an Ethernet cable.

The payload information is associated with the connection path and includes any information that is relevant to establishing the connection, e.g., such as relevant Internet Protocol (IP) addresses, handshake information, operating settings, etc. According to some approaches, the payload information sent between the locations to form a given connection path may even include one of the connection names created in operation 414, e.g., as will soon become apparent.

With continued reference to FIG. 4A, operation 416 includes assigning one of the connection names to each of the connection paths. Thus, after the connection paths are formed, each preferably includes a connection name which corresponds thereto. Each of these connection names are further correlated to a specific combination of data management policies, thereby inherently providing the relevant data management information which corresponds to the data being sent along the respective connection path. As mentioned above, each portion of data formed is preferably afforded a connection path extending between the first host location and the remote storage device. It follows that associating one of the connection names with the connection path that is assigned to a given portion of data allows for data to be sent along the connection path, received at the remote storage device, and processed as desired without having to attach specific data management instructions to each file, object, etc. that is sent to the remote storage device. This significantly reduces the amount of network traffic that is experienced, particularly in comparison to conventional implementations. As a result, system performance becomes more efficient, and resource consumption is reduced overall.

This also improves the ingestion efficiency at the storage device as each portion of data (e.g., file, object, etc.) received is treated the same. In other words, the device is able to group manage the portions of data as a result of knowing they will each be processed the same or a similar way. This allows for a storage device to better manage the numerous portions of data that are received. For instance, the storage device may batch portions of data into groups, replicate the batches as groups, etc., or any other procedures which increase the efficiency by which the portions of data are processed.

Accordingly, operation 418 includes sending each portion of data to the remote storage device at node 403 along the connection path having the connection name that is correlated with the combination of data management policies which corresponds to the given portion of data. In other words, operation 418 includes sending each portion of data formed in operation 404 to the remote storage device along the communication path which identifies how the given portion of data should be processed when received. Each portion of data sent to the remote storage device may also include additional information, e.g., such as container and/or path information associated with the respective portion of data which may assist with processing the data. Moreover, the data may be sent along the communication paths in any desired form, e.g., as objects, logical files, etc.

Upon receiving the portions of data from the first host location along the connection path extending between the first host location and the storage device, the one or more processors at node 403 preferably identify how the portions of data should be managed. Accordingly, operation 420 includes matching each of the connection names which correspond to the different connection paths to one of the connection names previously received from the host. It follows that the previously received connection names and the specific combinations of data management policies which correspond thereto may have been stored in memory (e.g., in a lookup table) for future use. Operation 420 is thereby performed in some approaches by accessing a lookup table to determine the data management policies that correspond to a given connection name.

Figure 4B:
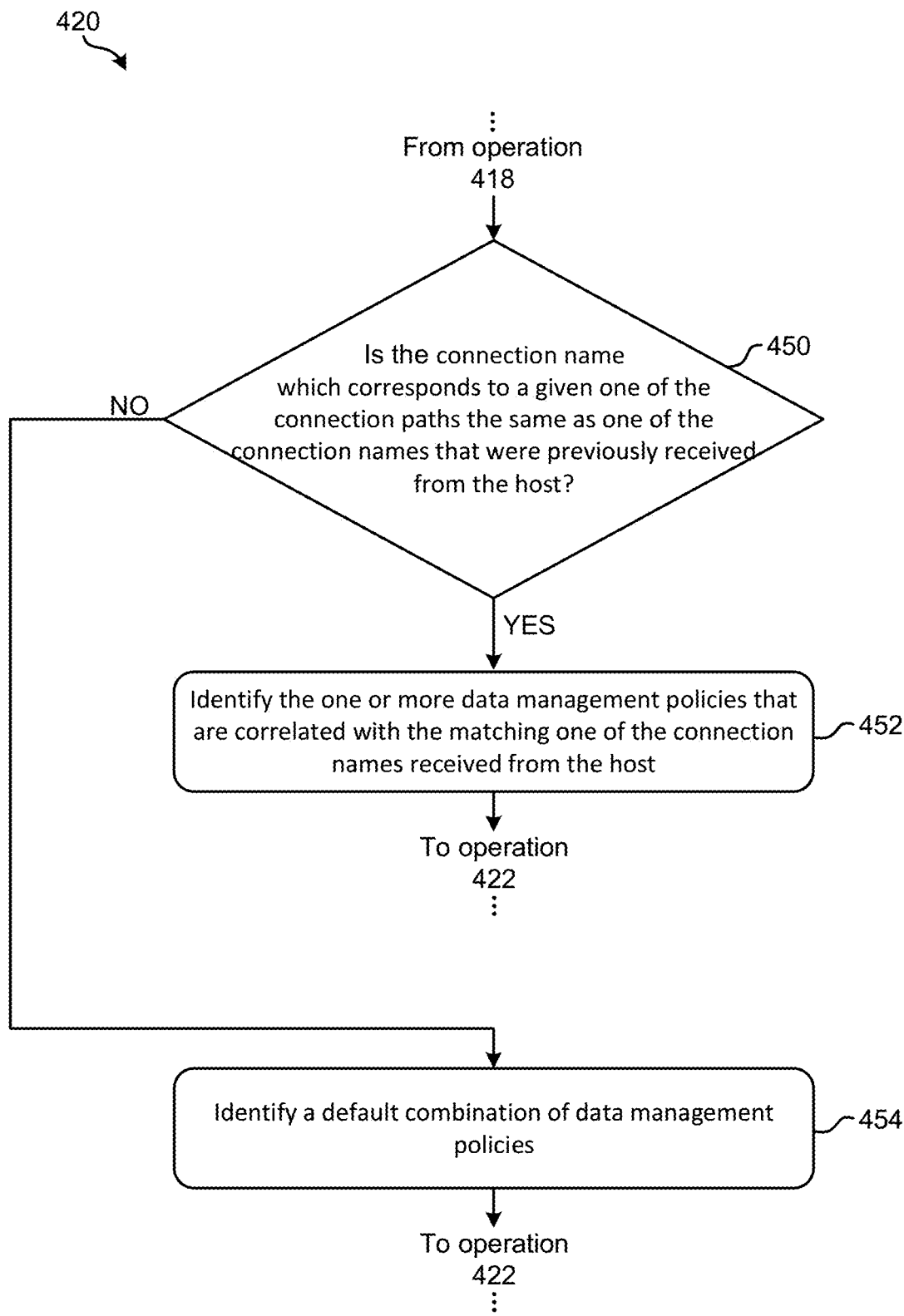
FIG. 4B is a flowchart of sub-processes for one of the operations in the method of FIG. 4A, in accordance with one embodiment.

Referring momentarily to FIG. 4B, exemplary sub-processes of matching each of the connection names which correspond to the different connection paths to one of the connection names previously received from the host are illustrated in accordance with one embodiment, one or more of which may be used to perform operation 420 of FIG. 4A. It follows that the sub-processes included in FIG. 4B may be repeated for each connection name from each connection path. However, it should be noted that the sub-processes of FIG. 4B are illustrated in accordance with one embodiment which is in no way intended to limit the invention.

As shown, decision 450 includes determining whether the connection name which corresponds to a given one of the connection paths is the same as one of the connection names that were previously received from the host. As mentioned above, any number and/or type of connection names may have been previously received from the first host location, each of which is correlated with a specific one or more of the data management policies. Moreover, these predetermined relationships between the connection names and the data management policies are stored in memory in some approaches. Decision 450 may thereby be performed by accessing a lookup table and determining whether the given connection name is included therein. However, decision 450 may be performed in any desired manner, e.g., by sending a specific request to the first host location, correlating a unique combination of data management policies in real time based on predetermined rules, etc.

As shown, the flowchart proceeds to sub-operation 452 in response to determining that the connection name is the same as one of the connection names that were previously received from the host. There, sub-operation 452 includes identifying the one or more data management policies that are correlated with the matching one of the connection names received from the host. However, in response to determining that the connection name is not the same as any of the connection names that were previously received from the host, the flowchart proceeds to sub-operation 454. There, sub-operation 454 includes identifying a default combination of data management policies. The default combination of data management policies may be predetermined by a host in some approaches.

Returning to FIG. 4A, whatever combination of data management policies are identified for a given portion of data as a result of performing operation 420 are used to actually process the portion of data. Accordingly, operation 422 further includes processing the received portion of data according to the one or more data management policies identified in operation 420. If follows that in some approaches a portion of data is processed according to a default combination of data management policies, while in other approaches the data is processes according to a combination of data management policies that are specific for that portion of data.

It follows that various ones of the embodiments included herein are able to associate connection names with connection paths based on what data will be transmitted along each of the respective connection paths. Therefore, portions of data may be sent along each of the connection paths, subsequently received at a remote storage device, and processed as desired without having to attach specific data management instructions to each file, object, etc. that is sent to the remote storage device. This significantly reduces the amount of network traffic that is experienced, particularly in comparison to conventional implementations. As a result, system performance becomes more efficient, and resource consumption is reduced overall. This also allows for a drastic reduction of overhead and management of data by providing a way to simply move the data without establishing complex host data management processes.

It should also be noted that although various ones of the embodiments included herein have been described in the context of storage systems which include one storage device that is coupled to a single host location, this configuration is in no way intended to limit the invention. Rather, any of the embodiments included herein may be modified to include a storage system which include more than one storage device and/or more than one host location. It follows that one or more hosts may be coupled to one or more storage devices according to any of the approaches included herein.

Figure 5:
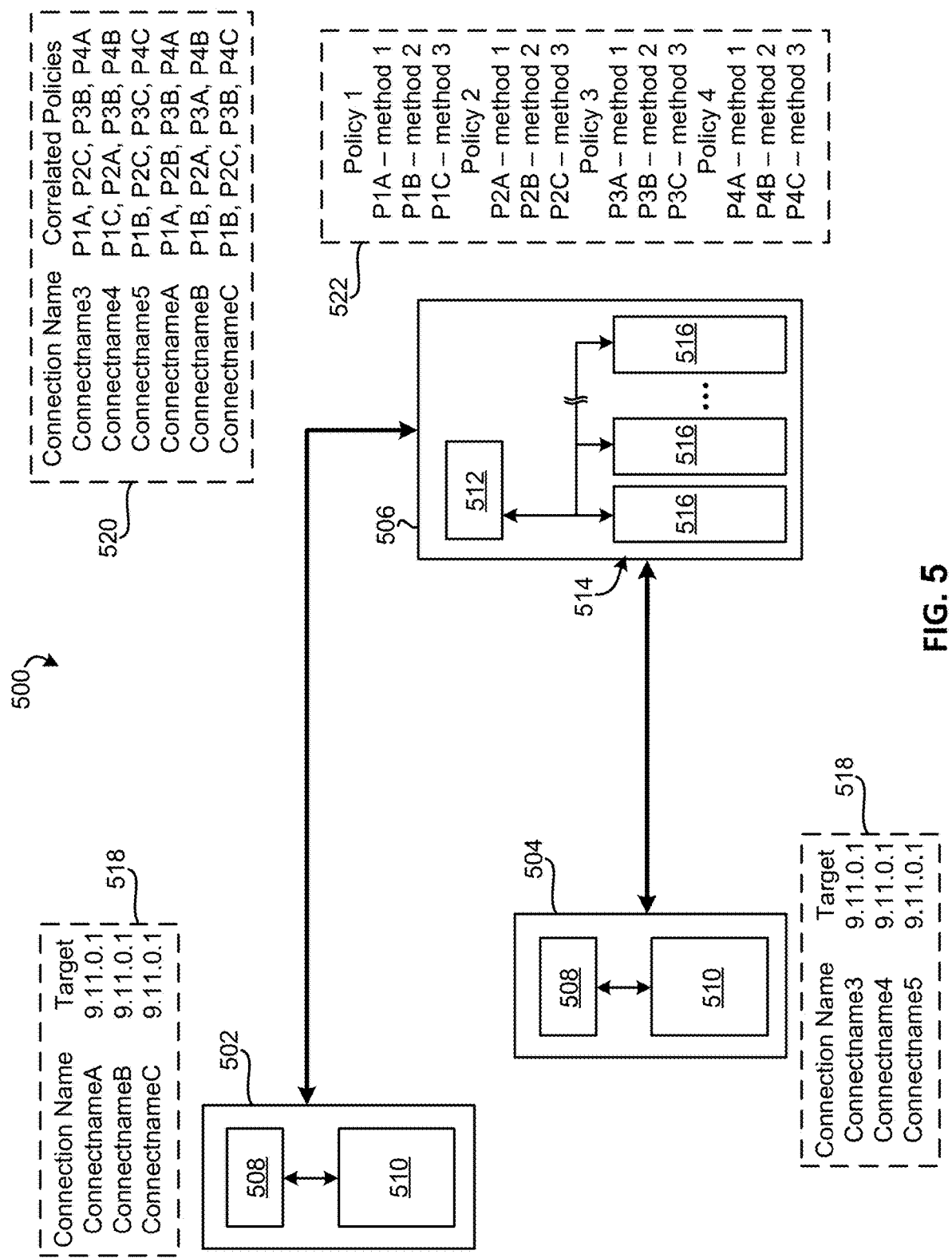
FIG. 5 is a partial representational view of a distributed data storage system in accordance with one embodiment.

For instance, looking now to FIG. 5, a distributed data storage system 500 is illustrated in accordance with one embodiment. As an option, the present distributed data storage system 500 may be implemented in conjunction with features from any other embodiment listed herein, such as those described with reference to the other FIGS., such as FIGS. 4A-4B. However, such distributed data storage system 500 and others presented herein may be used in various applications and/or in permutations which may or may not be specifically described in the illustrative embodiments listed herein. Further, the distributed data storage system 500 presented herein may be used in any desired environment. Thus FIG. 5 (and the other FIGS.) may be deemed to include any possible permutation.

As shown, the distributed data storage system 500 includes a first host location 502 and a second host location 504, each of which are connected to a remote data storage device 506. In the present embodiment, the host locations 502, 504 are connected to the remote data storage device 506 over a physical electrical connection, e.g., a cable, a fiber-optic link, a wire, Ethernet cable, etc. However, as mentioned above, the host locations 502, 504 may be connected to the remote data storage device 506 using a wireless connection, e.g., WiFi, Bluetooth, a cellular network, etc., or any other type of connection which extends between the locations and which would be apparent to one skilled in the art after reading the present description.

Each of the host locations 502, 504 include a controller 508 (e.g., one or more processors) which is coupled to memory 510. The memory 510 may include any desired type of memory, and may even act as a cache in some approaches. The remote data storage device 506 also includes a controller 512 which is coupled to an array 514 of data storage devices 516. Again, the data storage devices may include any desired type(s) of memory, e.g., depending on the approach.

Each of the host locations 502, 504 also include a lookup table 518, each of which specify connection names "Connection Name" and the destination of the connection paths that correspond thereto "Target". While the destination of each of the connection paths have been represented in the present approach as IP addresses, this is in no way intended to limit the invention. Rather, it should be noted that a given connection path is in no way intended to be tied to a specific IP address, e.g., as would be appreciated by one skilled in the art after reading the present description.

The remote data storage device 506 also includes a lookup table 520 which includes all of the connection names "Connection Name" identified in the lookup tables 518 at each of the host locations 502, 504. The lookup table 520 also includes the specific combination of data management policies "Correlated Policies" that are correlated to each of the connection names. The data management policies identified in lookup table 520 are explained in further detail in policy table 522 which identifies the actual data management methods (e.g., "processes") which are performed as a result of implementing the given data management policy. It follows that as data is sent along a given connection path which extends from one of the host locations 502, 504 to the remote data storage device 506, the connection name associated with the given connection path may be used to identify which specific data management policies should be applied to the data as it is received, e.g., according to any of the approaches described herein (e.g., with respect to method 400 above). It should also be noted that each of the lookup tables 518, 520 and/or policy table 522 may be stored in the memory of the respective location in the distributed data storage system 500.

Again, various ones of the embodiments included herein are able to provide a way to more efficiently utilize system resources in distributed data storage systems. For instance, host users specify where data is being sent for storage, typically in the form of an IP Address or URL with a connection name, account ID, etc., or other beneficial information. The approaches included herein are thereby able to leverage this destination information and allow for a way to associate the storage system policies (e.g., rules) to a particular connection path. For instance, a host can separate data into portions (e.g., batches), each of which are preferably managed in a same way. In doing so, the host is able to simply send each portion of data using a specific connection name rather than assigning a set of management policies to each individual object or data set. These connection names are further associated with a predetermined set of policies, thereby allowing the storage device to manage the data instead of the host system. This also desirably reduces the amount of resources within the host system.

The host is able to assign any desired combination of data management policies to each connection name at the storage device level. Accordingly, the storage device will identify the connection name and understand how to manage each piece of data or a subset of data, rather than the host themselves. This allows any host to send down any type of data without making major modifications to their system(s) in addition to allowing the storage device to handle data management according to the host's specifications.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
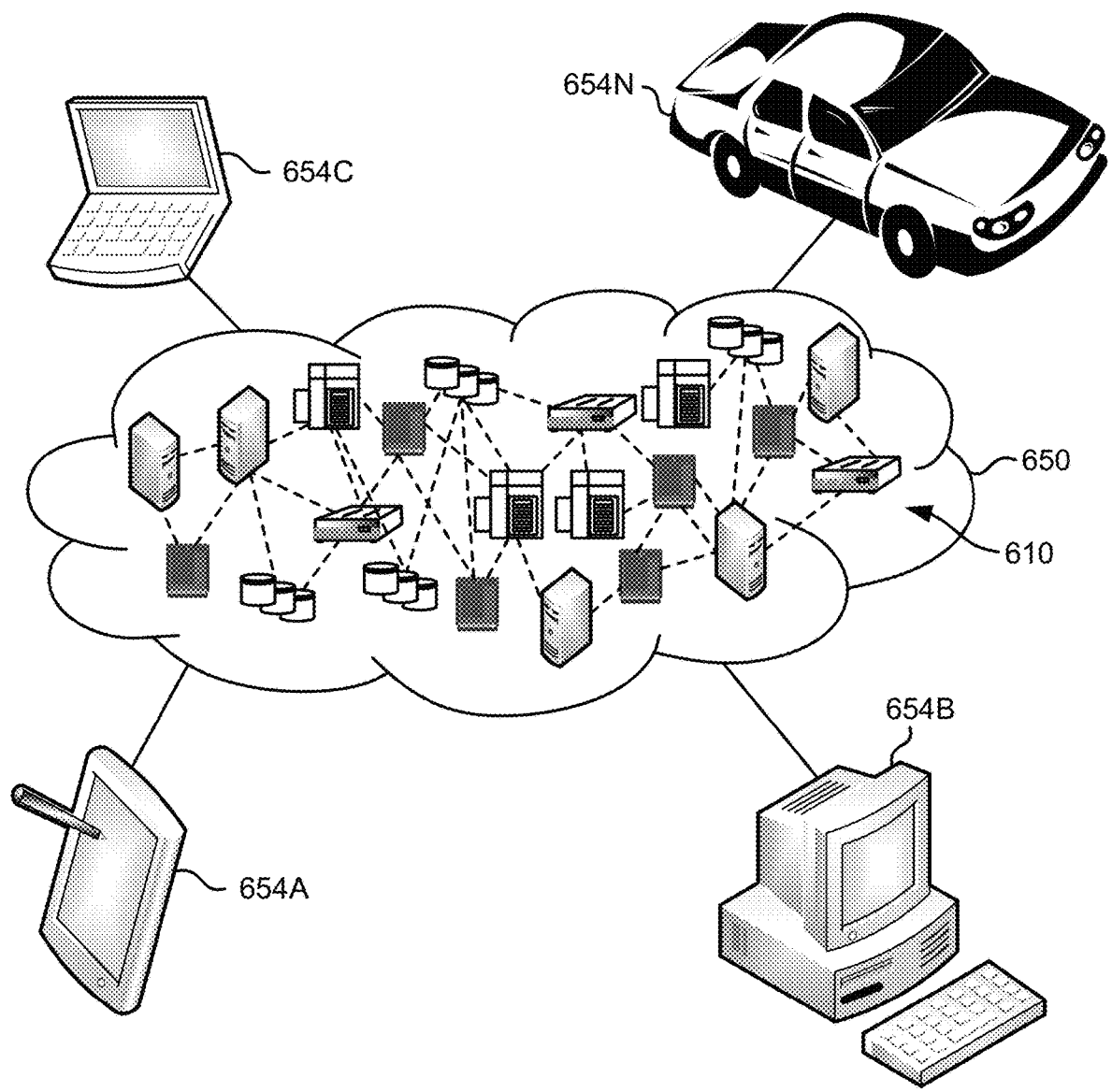
FIG. 6 is a partial representational view of a cloud computing environment in accordance with one embodiment.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
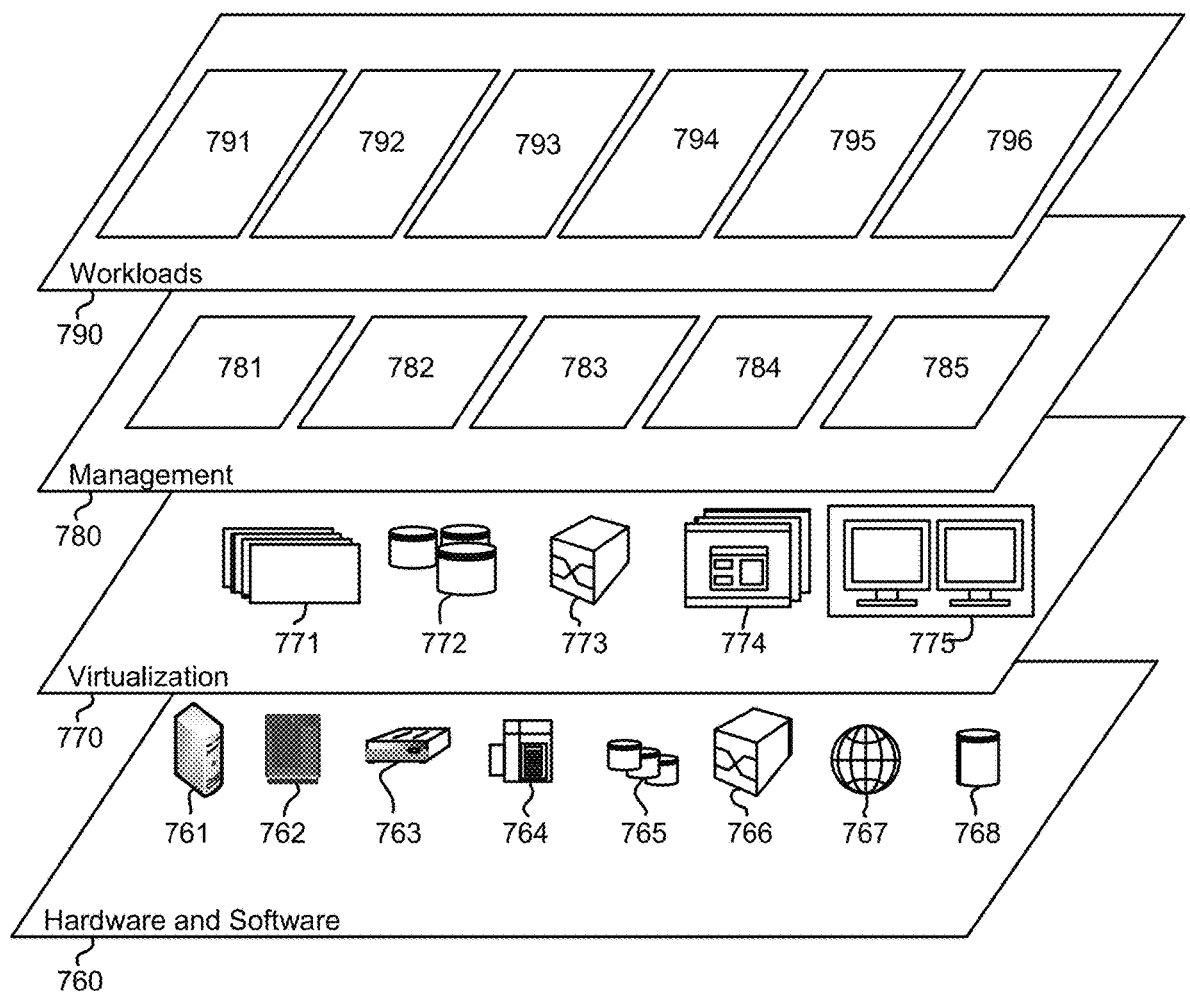
FIG. 7 is a representational view of abstraction model layers in accordance with one embodiment.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and managing data according to predetermined data management policies 796.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for managing data received at a storage device, comprising:
receiving data management policies;
receiving two or more connection names from a host, wherein each of the connection names is correlated with a combination of at least two of the data management policies, wherein each of the combination of at least two of the data management policies is formed by:
evaluating first data and characteristics that are associated with the first data, based on the evaluation, identifying an overall profile that includes:
properties of the first data to promote,
and other properties of the first data to demote;
creating a connection path which extends between the storage device and the host, wherein the connection path has a connection name which corresponds to the connection path, wherein creating the connection path which extends between the storage device and the host includes:
  receiving payload information associated with the connection path, wherein the payload information includes one or more relevant Internet Protocol addresses and handshake information,
  and using the payload information to create the connection path;
  receiving data along the connection path;
  matching the connection name which corresponds to the connection path to one of the connection names received from the host;
  and processing the received data according to the combination of at least two data management policies that are correlated with the matching one of the connection names received from the host.

2. The computer-implemented method of claim 1, wherein matching the connection name which corresponds to the connection path to the one of the connection names received from the host includes:
  determining whether the connection name which corresponds to the connection path is the same as the one of the connection names received from the host; and
  in response to determining that the connection name which corresponds to the connection path is the same as the one of the connection names received from the host, identifying the one of the connection names received from the host as matching.

3. The computer-implemented method of claim 2, wherein matching the connection name which corresponds to the connection path to the one of the connection names received from the host includes:
  in response to determining that the connection name which corresponds to the connection path is not the same as any of the connection names received from the host, processing the received data according to a default data management policy.

4. The computer-implemented method of claim 1, wherein the received data includes container and/or path information associated with the data.

5. The computer-implemented method of claim 1, wherein the data management policies correspond to an aspect of data storage selected from the group consisting of: data redundancy, physical storage location, data compression, data retention, and data encryption.

6. The computer-implemented method of claim 1, wherein the connection name which corresponds to the connection path is included in the received payload information.

7. The computer-implemented method of claim 1, wherein the connection path is created using a physical electrical connection that extends between the storage device and the host.

8. The computer-implemented method of claim 7, wherein the physical electrical connection is a fiber channel cable.

9. A system, comprising:
  a processor; and
  logic integrated with the processor, executable by the processor, or integrated with and executable by the processor, the logic being configured to:
    receive, by the processor, data management policies;
    receive, by the processor, two or more connection names from a host, wherein each of the connection names is correlated with a combination of at least two of the data management policies, wherein each of the combination of at least two of the data management policies is formed by:
      evaluating first data and characteristics that are associated with the first data, based on the evaluation, identifying an overall profile that includes:
      properties of the first data to promote,
      and other properties of the first data to demote;
    create, by the processor, a connection path which extends between a storage device and the host, wherein the connection path has a connection name which corresponds to the connection path;
    receive, by the processor, data along the connection path;
    match, by the processor, the connection name which corresponds to the connection path to one of the connection names received from the host;
    and process, by the processor, the received data according to the combination of at least two data management policies that are correlated with the matching one of the connection names received from the host.

10. The system of claim 9, wherein matching the connection name which corresponds to the connection path to the one of the connection names received from the host includes:
  determining whether the connection name which corresponds to the connection path is the same as the one of the connection names received from the host; and
  in response to determining that the connection name which corresponds to the connection path is the same as the one of the connection names received from the host, identifying the one of the connection names received from the host as matching.

11. The system of claim 10, wherein matching the connection name which corresponds to the connection path to the one of the connection names received from the host includes:
  in response to determining that the connection name which corresponds to the connection path is not the same as any of the connection names received from the host, processing the received data according to a default data management policy.

12. The system of claim 9, wherein the received data includes container and/or path information associated with the data.

13. The system of claim 9, wherein the data management policies correspond to an aspect of data storage selected from the group consisting of: data redundancy, physical storage location, data compression, data retention, and data encryption.

14. The system of claim 9, wherein creating the connection path which extends between the storage device and the host includes: receiving payload information associated with the connection path, wherein the connection name which corresponds to the connection path is included in the received payload information.

15. The system of claim 9, wherein the connection path is created using a physical electrical connection that extends between the storage device and the host.

16. The system of claim 15, wherein the physical electrical connection is a fiber channel cable.

* * * * *